Feb. 23, 1926.
S. D. BLACK ET AL
1,574,020
ELECTRIC CORD PROTECTOR
Filed May 19, 1923
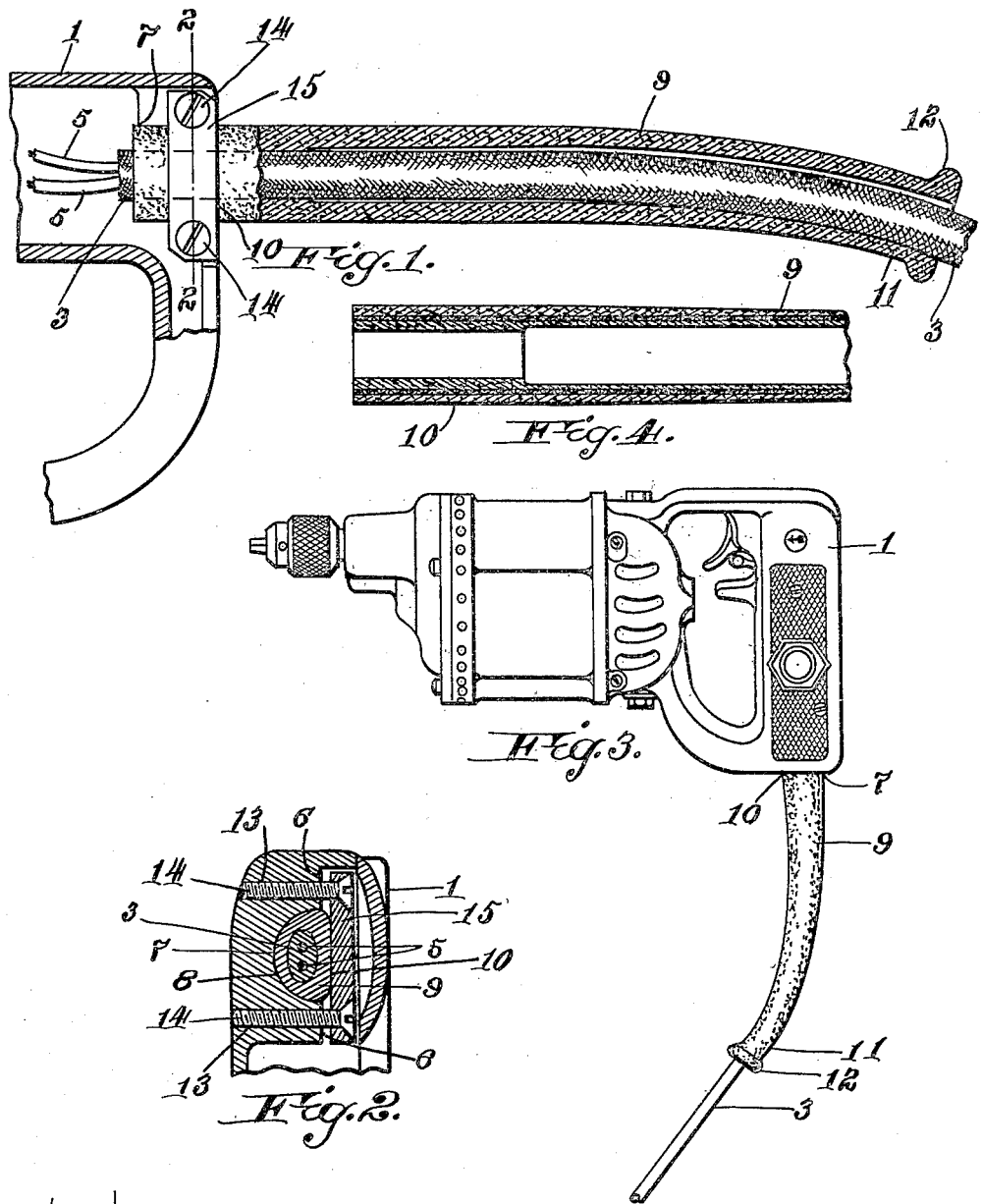

Patented Feb. 23, 1926.

1,574,020

UNITED STATES PATENT OFFICE.

SAMUEL DUNCAN BLACK AND ALONZO GALLOWAY DECKER, OF BALTIMORE COUNTY, MARYLAND, ASSIGNORS TO THE BLACK & DECKER MANUFACTURING COMPANY, OF TOWSON, MARYLAND, A CORPORATION OF MARYLAND.

ELECTRIC-CORD PROTECTOR.

Application filed May 19, 1923. Serial No. 640,034.

*To all whom it may concern:*

Be it known that SAMUEL DUNCAN BLACK and ALONZO GALLOWAY DECKER, citizens of the United States of America, both residents of the county of Baltimore, State of Maryland, have invented certain new and useful Improvements in Electric-Cord Protectors, of which the following is a specification.

The invention relates to portable electric apparatus, particularly electric tools, and other portable electric devices which are connected to a source of electricity by means of a flexible conductor referred to as a cord which permits the tool or other portable device to be manipulated in such manner as may be necessary to its use without interfering with the flow of current necessary to its operation.

The use of these devices subjects the cord to many destructive stresses at the point where the conductor enters the apparatus which eventually results in breaking the strands of the conductor in the vicinity of the point of connection of the flexible conductor or cord to the tool. These stresses, though they sometimes occur as direct pulls on the cord most frequently occur in the form of side pulls and twists. Whatever the origin of these side pulls and twists, they result, in almost every instance, in bending the cord sharply in the section immediately adjacent the point of attachment to the tool.

Failure of the conductor at this point is so frequent on account of these sharp bends and twists to which the cord is subjected that numerous means of protecting it have been devised. Some of these have become well known, such as the expedient of winding spring wire about the cord or enclosing it within a piece of rubber hose. In fact the present invention may be treated as an improvement on the latter device.

The applicants have, in numerous instances, utilized the familiar hose type of protecting device and are familar with its defects. This type of protecting member or support, as now in general use, consists of a piece of flexible rubber hose of substantially uniform internal and external diameter throughout its length, the tube or hose being secured at one end to the tool frame where it encloses the point of connection of the cord to the frame, the cord being thus enclosed for the full length of the hose.

Neither this device nor any other, which is known to the applicants, has proved effective as a protection for the cord. The principal difficulty encountered with the hose is that being of substantially uniform cross section, it offers a uniform resistance to bending and subjects the cord to sharp twists and bends at the point where it leaves the end of the hose. These bends and twists are almost as sharp as they would be in the absence of such protection.

The percentage of failure of the cords at this point has been extensively reduced and failure has been substantially eliminated by the improved device which consists of a rubber tube of gradually reduced cross section from a point adjacent the tool to its outer end, which end portion is so reduced in thickness as to substantially conform to the direction of the pull applied to the cord or to the direction of the cord, so that the cord is subjected to no sharp turns, twists or bends near the point of attachment to the tool, the tendency to such destructive application of the pulls on the cord being, on the contrary, completely eliminated by the tapered protecting device, which, under the action of all stresses, forms itself and the end portion of the cord in a substantially uniform curve which is continuous with the direction of the cord and which affords complete protection against the destructive action described.

In the accompanying drawing: we have illustrated an electric tool with a flexible conducting cord to which the protecting device of our invention is applied.

In the drawing:

Fig. 1 is a cross-section taken on the axis of our tubular protecting member showing the conducting cord in elevation and a portion of the tool handle in section.

Fig. 2 is a section on the line 2—2, Fig. 1, looking to the right, in said figure.

Fig. 3 is an elevation of an electric tool supplied with the protecting device of the invention.

Fig. 4 is a section corresponding to Fig. 1 with the tool fragment and conducting cord omitted.

Referring to the drawings by numerals:

The tool handle or tool casing 1, is provided with a hole or opening at a convenient point to admit the cord or conductor, 3 enclosed in the protecting tube. In the form of the invention shown, the end of the covered portion of the cord which contains two separately insulated wires, 5, the said end portion being duly enclosed in the protector 9, is introduced into the tool casing 1 through an opening 7 therein, the casing being provided at the side of said opening 7, with an oblong seat 8 which intersects said opening 7, cutting off a considerable arc at the side of said opening as shown. The seat provides shoulders 6 at each side of said intersection, which shoulders are provided with screw holes 13 to receive screws 14 holding a clamping block 15, which occupies said seat, being pressed against the protector by the tension of said screws, clamping the protector tube and cord tightly in their relation to the tool frame. The thickened portion of the protector being thus in effect rigidly connected to the tool.

As aforesaid, the protecting tube or hose, 9, encloses the cord from and including the point of attachment to the tool to the outer end of the hose and is formed with a reducing taper from its point of attachment, 10, to its outer end, 11, where it may be provided with a suitable bead, 12, encircling its outer end to reinforce the tube at this point, it being understood that the taper is not necessarily uniform but the end portion of the hose is thin enought and flexible enough to assume the direction of pull of the cord and the part near the tool is thick and stiff enough to support the cord. As clamped it forms at the extreme butt 10 a relatively rigid extension of the frame which gradually increases in flexibility toward the free end. In the commercial form of the invention, with the small size tools as quarter inch drills, the protector is approximately seven inches long, one inch inside the casing and six inches outside, and about three-quarters of an inch in outside diameter at the butt, the walls being thickest at the butt and reduced gradually and uniformly toward the free end, the outside dimension tapering to a half inch at the free end, so that the tube presents a graduated resistance to lateral stresses which increases from the free end toward the butt, and the free end of the protector when the cord is tightened, assumes a curve which is continuous with the cord and tangent thereto. While it is not the intention of the applicants to limit the claim to exactly the proportions named, this example will serve as a general definition of the meaning of the terms "elongated" and "gradually tapered", as used in the claim.

An important feature of the invention resides in the provision of a considerable degree of play on the part of the cable or cord 3 relatively to the tube 9, the passage or opening through the tube, as shown in Figure 1, being of considerably greater diameter than the external diameter of the cable whereby the cord is permitted to slide freely relatively to the tube, as both members bend in response to lateral pull on the cable, the play or freedom of the cords in the tube or protector providing for longitudinal motion of the cord within the cable to provide for the change in relation of the parts and the change of the ratio of the respective arcs of curvature assumed by the tube and cord as different degrees of lateral tension or applied thereto at different angles, it being, of course, understood that the difference in length between two parallel arcuate lines increases as the radius decreases, it being clear that if the radius is infinitely long and the lines straight, there will be no such variation, and that as the sharpness of curvature increases, the variation in length between the two parallel curved members increases as already pointed out. This change of curvature tending to produce relative longitudinal motion of the cord relatively to the tube, is compensated by the provision of a tube with an opening larger than the diameter of the cord, so that the latter moves freely back and forth as the protector is bent at various angles.

It will be easily appreciated that in this way the greatest possible protection to the cord against rupture on account of bending near the point of attachment to the tool is afforded. In fact, the use of the apparatus shows that injury to the cord on this account at this point is substantially eliminated.

In Fig. 4 we have shown a protecting tube constructed in accordance with our invention in a slightly modified form in that the tube or hose is formed of layers of fabric and rubber instead of being homogeneous rubber or similar or equivalent composition as illustrated in Fig. 1.

We have thus described specifically and in detail the manner of constructing and applying the device of our invention in order that the nature and operation of the same may be clearly understood, however, the specific terms therein are used descriptively rather than in a limiting sense the scope of the invention being defined in the claim.

What we claim and desire to secure by Letters Patent is:

The combination with a conducting cord and a portable electric tool to which the conductor is connected, of a cord protector consisting of an elongated tube of flexible material enclosing and fitting loosely about the cord, permitting the cord to slide freely in the tube, the tube having a gradual taper, the thickness of the walls of the tube increasing toward the tool, the larger end of the tapered protector being inserted in the tool casing which has an opening to receive the same, and clamping means for rigidly securing the large end of the protector tube in the tool casing, so that it forms a substantially rigid extension of the tool casing gradually increasing in flexibility to the free end portion, which is relatively thin and reinforced to prevent tearing, the increased flexibility at the end permitting the protector at this point to conform to the direction of the cord, the protector presenting a graduated resistance to lateral stresses, causing the portion of the cord within the tube to assume a smooth curved line continuous with the direction of the remainder of the cord.

Signed by us at Baltimore, Maryland, this 17th day of April, 1923.

SAMUEL DUNCAN BLACK.
ALONZO GALLOWAY DECKER.